(12) United States Patent
Schwenkert

(10) Patent No.: US 11,592,551 B2
(45) Date of Patent: Feb. 28, 2023

(54) RADOME FOR A RADAR SENSOR OF A MOTOR VEHICLE AND MOTOR VEHICLE

(71) Applicant: AUDI AG, Ingolstadt (DE)

(72) Inventor: Michael Schwenkert, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 233 days.

(21) Appl. No.: 17/073,821

(22) Filed: Oct. 19, 2020

(65) Prior Publication Data

US 2021/0132217 A1    May 6, 2021

(30) Foreign Application Priority Data

Oct. 31, 2019    (DE) .................... 10 2019 129 507.6

(51) Int. Cl.
*G01S 13/931* (2020.01)
*H01Q 1/32* (2006.01)
*H01Q 1/42* (2006.01)

(52) U.S. Cl.
CPC ......... *G01S 13/931* (2013.01); *H01Q 1/3233* (2013.01); *H01Q 1/422* (2013.01)

(58) Field of Classification Search
CPC .... H01Q 1/3233; H01Q 1/3283; H01Q 1/422; G01S 13/931; G01S 7/027
See application file for complete search history.

(56) References Cited

U.S. PATENT DOCUMENTS

| 5,408,244 A | 4/1995 | Mackenzie | |
| 2002/0089428 A1* | 7/2002 | Walden | G01D 4/008 340/870.02 |
| 2017/0279202 A1* | 9/2017 | Galla | H01Q 19/062 |
| 2020/0153093 A1* | 5/2020 | Goetzelmann | H01Q 1/3283 |
| 2020/0321694 A1* | 10/2020 | Harrer | H01Q 1/42 |

FOREIGN PATENT DOCUMENTS

| DE | 20219029 U1 | 2/2003 |
| DE | 10 2013 221 055 A1 | 4/2015 |
| DE | 102014213502 A1 | 1/2016 |
| EP | 2 775 011 A1 | 9/2014 |
| EP | 3 480 007 A1 | 5/2019 |
| JP | 2018-154878 A | 10/2018 |

OTHER PUBLICATIONS

Examination Report dated Aug. 31, 2020 in corresponding German application No. 10 2019 129 507.6; 8 pages including Machine-generated English-language translation.
Office Action dated Aug. 22, 2022, in connection with corresponding German Application No. 10 2019 129 507.6 (8 pp., including machine-generated English translation).

* cited by examiner

*Primary Examiner* — Timothy A Brainard
(74) *Attorney, Agent, or Firm* — Maier & Maier, PLLC

(57) ABSTRACT

A radome for a radar sensor of a motor vehicle, having at least one main body facing the radar sensor, through which main body radar beams are intended to pass and which is made of at least one optically non-transparent material, which radome has a first dielectric constant at least on a side facing away from the radar sensor, wherein the radome also has an optically transparent foil with a second dielectric constant which lies between the first dielectric constant and the dielectric constant of air, said foil being applied on the side facing away from the radar sensor and at least in the region of the main body through which the radar beams are intended to pass.

18 Claims, 1 Drawing Sheet

RADOME FOR A RADAR SENSOR OF A MOTOR VEHICLE AND MOTOR VEHICLE

FIELD

The disclosure relates to a radome for a radar sensor of a motor vehicle, having at least one main body facing the radar sensor, through which main body radar beams are intended to pass and which is made of at least one optically non-transparent material, which radome has a first dielectric constant at least on a side facing away from the radar sensor. The disclosure furthermore relates to a motor vehicle.

BACKGROUND

Radar sensors are often used in modern motor vehicles for detecting the surroundings. In order to protect the radar sensor and also for design reasons, it is known to conceal radar sensors behind other components of the motor vehicle, which then act as a radome for the radar sensor. For example, it is known to install at least one radar sensor within a bumper and/or behind a radar-permeable window within a door of the motor vehicle. While such components, in particular bumpers and radar-permeable windows, are mostly made of plastic, it is also known to paint the components from the outside in order to better integrate them into the overall appearance of the motor vehicle, or to treat them in other ways in terms of design. The problem herein is that the paints and/or plastics used can lead to extremely high losses in the transmission of the electromagnetic energy of the radar beams. This in turn leads to losses in the performance of the radar sensor and in vehicle functions using radar data from the radar sensor. On the other hand, if such performance limitations are not desired, this can also lead to constraints in the installation of the radar sensors behind painted surfaces or generally behind plastics or other radomes. It is also conceivable to accept constraints in the exterior design of motor vehicles.

EP 2 775 011 A1 relates to a metal coating for the transmission of electromagnetic waves and a radome for a vehicle radar device. The aim is to create a thin metal layer permeable to electromagnetic waves, for which more than 10,000 fine thin-film metal pieces per square millimeter are to be provided electrically insulated from one another on a surface of a substrate. EP 3 480 007 A1 relates to a metal component which is permeable to electromagnetic waves and which has a metal layer and a fissure layer, which have a plurality of linear refractions in their respective planes which extend essentially parallel to one another. JP 2018-154878 A also proposes a metal coating that is permeable to electromagnetic waves, which proposes a combination of micro-islands surrounded by micro-fissures.

These approaches therefore relate to the sometimes complex modification of shape-defining layers with a metallic appearance which at the same time need to be more permeable to radar beams. In other words, it is known to create layers that appear metallic and that are more transparent to radar waves than are comparable conventional layers that provide the visual appearance of a metallic surface, for example metallic paint layers.

SUMMARY

The problem underlying the invention is to provide a cost-effective option, which also is simple to implement, of increasing the radar transmission in radomes, particularly in those with a special visual design.

To solve this problem, it is provided, according to the invention, for a radome of the type mentioned above that the radome also has an optically transparent foil with a second dielectric constant which lies between the first dielectric constant and the dielectric constant of air, said foil being applied on the side facing away from the radar sensor and at least in the region of the main body through which the radar beams are intended to pass.

According to the invention, a measure is proposed that is easy to implement for reducing the reflection energy losses by attaching an optically transparent foil to existing structures, in this case the main body. The underlying physical operating principle is the use of the foil as a kind of matching element, according to which principle a foil with a medium dielectric constant $\epsilon_r$ (relative permittivity) is provided between a material with a higher dielectric constant $\epsilon_r$ and a medium with a lower dielectric constant $\epsilon_r$, air in this case. In this manner, the optically transparent foil maintains the original appearance of the main body, but improves the transition of the electromagnetic energy of the radar beams into the main body made of a material with higher absorption energy losses. The matching losses during a transition from air to a surface of the main body, in particular a painted surface, are minimized by a transformative element in the form of an optically transparent foil. The matching stage created in this way can decisively increase the transmission of the electromagnetic energy of the radar beams at the boundary layers.

In particular, due to the approach according to the invention, a layer matching the visual appearance of the main body does not have to be adapted in a complicated manner; instead, an easily available and applicable additional foil is sufficient to improve the transmissivity.

According to the invention it can be provided that the main body has a paint and/or a metallic appearance on its outer side, on which the foil is applied, which paint or appearance is visible through the foil. It is precisely such paints and/or other coatings, which are intended to produce an excellent outer appearance of the radome and thus of the component of the motor vehicle, that high values of the dielectric constant are often associated with. The use of thin foils, which nevertheless have a relatively high dielectric constant with good transmission values for the electromagnetic beams of the radar sensor, allows for providing a matching element with which matching losses can be reduced.

Specifically, the foil can consist of plastic, as corresponding plastics with suitable properties, the dielectric constant of which can also be selected appropriately, are already known in principle. After the transparency has been produced, suitable plastic foils can be created, which can be used as a matching element within the scope of the present invention. Therein, the foil, generally speaking, may have a thickness between 0.1 and 1 mm, wherein preferably thicknesses are avoided which represent multiples or integer fractions of the wavelength of the beams used by the radar sensor.

The second dielectric constant can be at least essentially halfway between the first dielectric constant and one, i.e., essentially the dielectric constant of air, and/or be in the range of 10-20. For example, in the case of metallic coatings or metallic paints, a first dielectric constant of 30, for example, can occur, such that 15, for example, can be selected as the second dielectric constant.

In addition to the radome, the present invention also relates to a motor vehicle having at least one radar sensor installed concealed behind a component forming or comprising a radome of the type according to the invention. All statements relating to the radome can be applied analogously to the motor vehicle according to the invention, which can also provide the advantages already mentioned.

Specifically, it can be provided, for example, that the component is a bumper or a bumper component. Especially when installing behind painted bumpers or painted bumper components, particularly high dielectric constants can occur on the part of the main body of the radome, such that it is particularly expedient to use the foil reducing the matching losses and at the same time preserving the visual appearance. For example, three radar sensors can be installed in a motor vehicle, concealed in a front and a rear bumper.

The invention can of course also be applied to other motor vehicle components, for example radar-permeable windows which are inserted into the body in order to enable the passage of radar beams and the like.

BRIEF DESCRIPTION OF THE DRAWINGS

Further advantages and details of the present invention follow from the exemplary embodiments described below and with reference to the drawings. Shown are.

DETAILED DESCRIPTION

Figure 1:
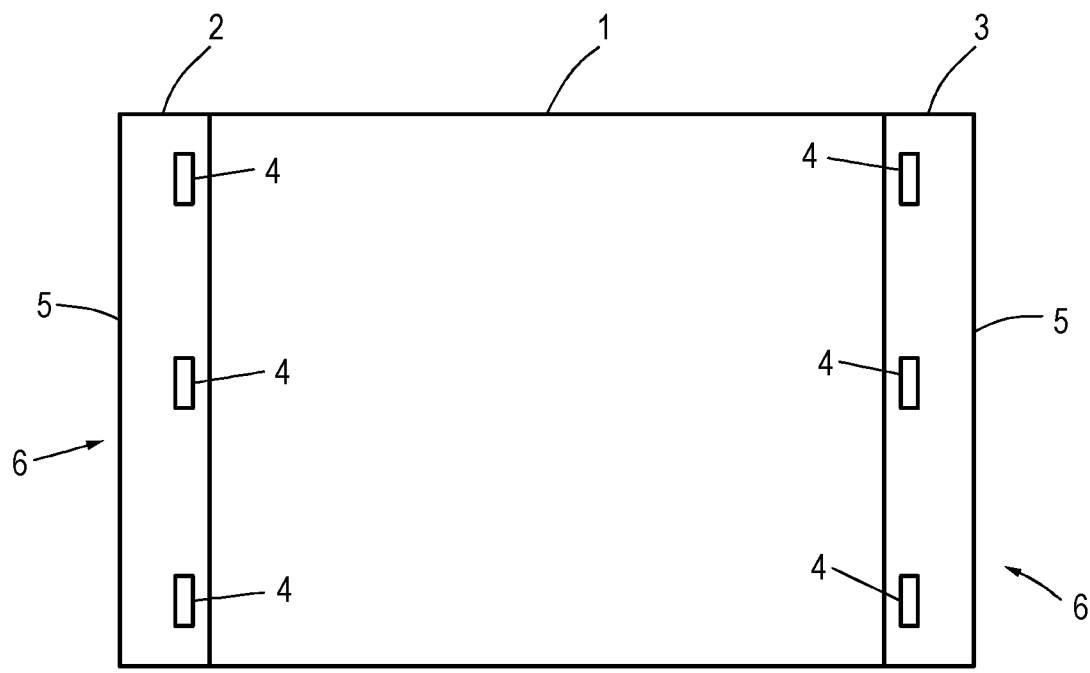
FIG. 1 A schematic diagram of a motor vehicle according to the invention.

FIG. 1 shows a schematic diagram of a motor vehicle 1 according to the invention. The motor vehicle 1 has a front bumper 2 and a rear bumper 3, which are composed, for example, of several bumper components. In the present case, three radar sensors 4 are provided in the bumpers 2, 3 in a concealed installation. In the present case, these are radar sensors 4 realized by means of semiconductor technology, in particular CMOS technology, with a compact design, the radar beams of which pass through a respective outer bumper component 5 as component 6 of the motor vehicle 1 for measuring, such that the bumper component 5 acts at least partially as a radome for the radar sensors 4.

Figure 2:
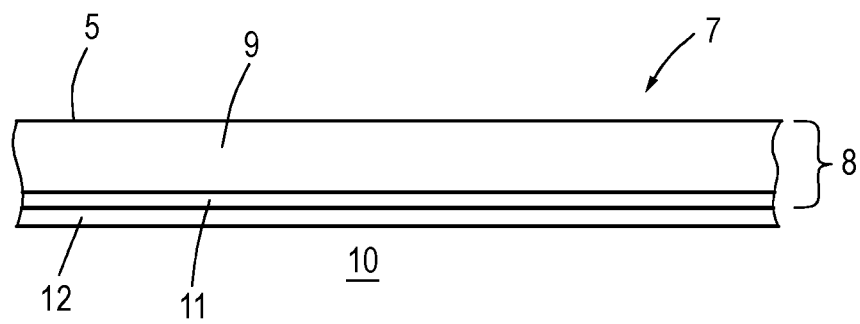
FIG. 2 The structure of a bumper component at least partially acting as a radome.

FIG. 2 shows the structure of the bumper component 5 acting as a radome 7 in more detail. An optically non-transparent main body 8 of the bumper component 5 initially comprises a plastic 9, of which the bumper component 5 mainly consists. Toward the outer side 10, the plastic component 9 is coated with a layer of paint 11, in the present case a metallic paint, which creates a metallic appearance and has a high first dielectric constant. This means that there is a large difference in the dielectric constant between the air present outside, the dielectric constant of which is essentially one, and the paint layer 11, which would lead to high matching losses when radar beams pass through the boundary layer.

Therefore, a foil 12 consisting of plastic is applied on the side of the paint layer 11 as a matching element, which may, for example, have a thickness in the range of 0.1 to 1 mm. The foil 12 has a second dielectric constant which lies between the dielectric constant of air, that is to say, one, and the first dielectric constant, such that the foil 12 forms a matching stage which reduces the matching losses. However, as the foil 12 has been designed to be optically transparent, it still allows the paint layer 11, and thus the external design of the main body 8, to be visible.

The invention claimed is:

1. A radome for a radar sensor of a motor vehicle, comprising:
   at least one main body facing the radar sensor, and
   an optically transparent foil,
   wherein the at least one main body is formed from at least one optically non-transparent material and is painted and/or coated, on a side facing away from the radar sensor, to have a metallic appearance,
   wherein the optically transparent foil is applied to the paint and/or coating,
   wherein radar beams are intended to pass through the at least one main body and the optically transparent foil,
   wherein the paint and/or coating has a first dielectric constant and the optically transparent foil has a second dielectric constant, and
   wherein the second dielectric constant is between the first dielectric constant and a dielectric constant of air.

2. The radome according to claim 1, wherein the optically transparent foil is made of plastic.

3. The radome according to claim 1, wherein the second dielectric constant is halfway between the first dielectric constant and the dielectric constant of air.

4. The radome according to claim 1, wherein the paint and/or coating is a metallic paint and/or a metallic coating.

5. The radome according to claim 1, wherein the optically transparent foil has a thickness between 0.1 mm and 1 mm.

6. The radome according to claim 1, wherein the second dielectric constant is between 10 and 20.

7. The radome according to claim 1, wherein the paint and/or coating is visible through the optically transparent foil.

8. The radome according to claim 1, wherein the first dielectric constant is approximately 30 and the second dielectric constant is approximately 15.

9. The radome according to claim 1, wherein the at least one main body is a painted or coated plastic bumper of the motor vehicle.

10. The radome according to claim 1, wherein the at least one main body is painted to have the metallic appearance,
    wherein the optically transparent foil is applied to the paint, and
    wherein the paint has the first dielectric constant.

11. The radome according to claim 10, wherein the paint is a metallic paint.

12. A motor vehicle comprising:
    at least one radar sensor installed concealed behind a component forming or comprising a radome,
    wherein the component comprises at least one main body facing the radar sensor and an optically transparent foil,
    wherein the at least one main body is formed from at least one optically non-transparent material and is painted and/or coated, on a side facing away from the radar sensor, to have a metallic appearance,
    wherein the optically transparent foil is applied to the paint and/or coating,
    wherein radar beams are intended to pass through the at least one main body and the optically transparent foil,
    wherein the paint and/or coating has a first dielectric constant and the optically transparent foil has a second dielectric constant, and
    wherein the second dielectric constant is between the first dielectric constant and a dielectric constant of air.

13. The motor vehicle according to claim 12, wherein the component is a bumper of the motor vehicle.

14. The motor vehicle according to claim 12, wherein the component is a bumper component of the motor vehicle.

15. The motor vehicle according to claim 12, wherein the component is a painted or coated plastic bumper of the motor vehicle.

16. The motor vehicle according to claim 12, wherein the at least one main body is painted to have the metallic appearance,
   wherein the optically transparent foil is applied to the paint, and
   wherein the paint has the first dielectric constant.

17. The motor vehicle according to claim 16, wherein the paint is a metallic paint.

18. The motor vehicle according to claim 16, wherein the component is a plastic bumper of the motor vehicle.

* * * * *